April 3, 1934. C. W. McGUIRK Re. 19,132

FLEXIBLE METALLIC COUPLING

Original Filed May 6, 1929

Mary McGuirk, Administratrix
of the estate of Charles W. McGuirk
By Ira J. Wilson Atty.

Reissued Apr. 3, 1934 Re. 19,132

UNITED STATES PATENT OFFICE 19,132

FLEXIBLE METALLIC COUPLING

Charles W. McGuirk, deceased, late of Albany, N. Y., by Mary McGuirk, Albany, N. Y., administratrix; said Charles W. McGuirk assignor to Barco Manufacturing Co., Chicago, Ill., a corporation of Illinois Original No. 1,756,094, dated April 29, 1930, Serial No. 360,738, May 6, 1929. Reissue No. 18,906, dated August 1, 1933, Serial No. 591,716, February 8, 1932. This application for reissue September 9, 1933, Serial No. 688,799

6 Claims. (Cl. 285—96)

The present invention comprehends the provision of a new and improved flexible metallic pipe coupling, primarily intended for use in coupling the pipes on a locomotive and its tender, although a general application of the invention is contemplated by the claims.

The chief characteristic of the present invention resides in the provision of a flexible pipe coupling constructed to permit relative rotation of one pipe section with relation to the other, with a minimum of friction, and a resultant maximum degree of flexibility, which cannot be in any way affected by the passing of fluid under a high pressure through the coupling.

The nature and advantages of the invention will be better understood when the detail description is read in connection with the accompanying drawing, the invention residing in the construction, combination and arrangement of parts as claimed.

In the drawing forming part of this application like numerals of reference indicate similar parts in the several views and wherein.

Figure 1:
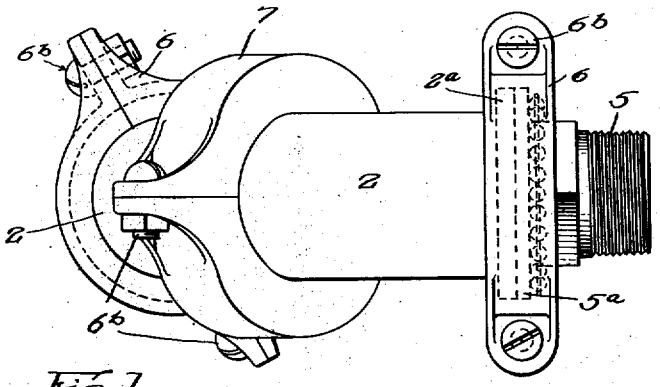
Figure 1 is a top plan view.
Figure 2:
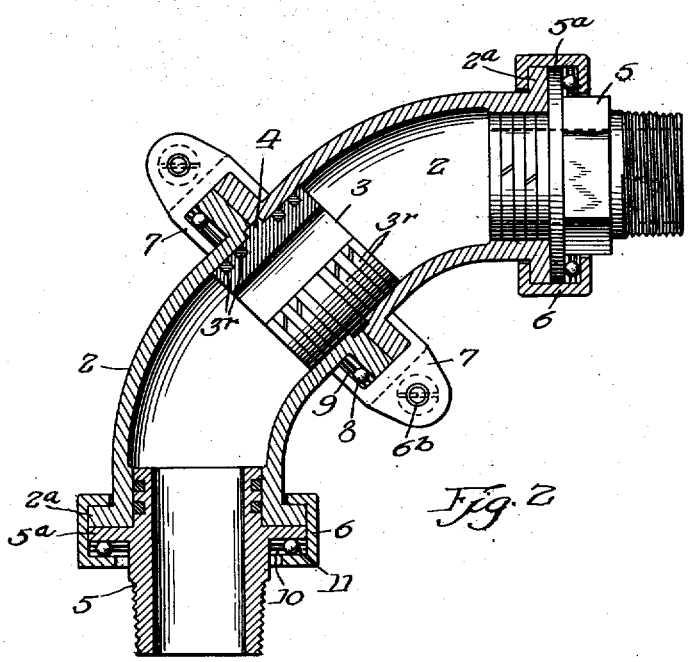
Figure 2 is a longitudinal sectional view.

In the drawing there has been illustrated a pair of pipe sections, each indicated at 2, and while these sections may be of any desired contour, they are preferably curved longitudinally as illustrated. It will be noted upon inspection of Figure 2 that each pipe section is formed with an annular flange $2^a$ at its outer end, while the inner end is formed with a similar flange. Each of the latter mentioned flanges is counter-bored as shown, so that when the pipe sections are arranged in end to end relation, the inner flanges thereby unitedly define an annular internal groove for a purpose to be presently described.

A nipple or sleeve indicated at 3 is partly received by the respective pipe sections, and forms a part of the coupling constituting the subject matter of the present invention. The nipple 3 may be of any suitable length, but it is centrally formed with an outwardly projecting annular flange 4 received by the internal groove above referred to and clearly illustrated in Figure 2. Surrounding the nipple 3 at either side of the flange 4 is a plurality of resilient packing rings $3^r$ which engage the inner surface of the pipe sections to provide a fluid-tight joint.

A split clamping ring 7 embraces the inner flanges of the respective pipe sections, and this ring is of substantially U-shaped formation in cross section to receive and effectively hold the pipe sections associated, in a manner which permits relative rotation of one section with relation to the other. The free ends of the clamping ring terminate to provide offset apertured lugs which are adapted to receive a fastening bolt and nut indicated generally at $6^b$. With a view of minimizing friction, and thus materially increase the degree of flexibility possessed by the coupling, ball bearings 8 are employed which are mounted in a suitable race 9 located between the inner flange on one of the pipe sections and the adjacent side wall of the clamping ring 7. As clearly shown in Figure 2 the ball bearings engage these latter mentioned members, so that the possibility of any binding action taking place between the pipe sections, when it is necessary to turn one pipe section with relation to the other is absolutely obviated.

Partly received by the outer end of each pipe section is a nipple indicated at 5, and that portion arranged within the pipe section is provided with a plurality of resilient packing rings which engage the pipe to provide a fluid-tight connection. Each nipple 5 is formed with an annular flange $5^a$ adapted to be arranged in contacting engagement with the adjacent flange $2^a$ of the respective pipe section, and the parts are held associated in a manner to permit relative rotation thereof, by means of a split clamping ring 6. This ring is substantially of the same construction as that above described, being substantially U-shaped in cross section as illustrated, with one side wall thereof in contacting engagement with the flange $2^a$ of the particular pipe section. Interposed between the other side wall of this ring and the flange $5^a$ of the nipple is a ball race 10, in which is mounted a plurality of ball bearings 11 which as above stated minimizes friction between the movable parts and at the same time provides for a maximum degree of flexibility of the pipe coupling in its entirety. A pipe coupling constructed in this manner is not only capable of retaining fluids under comparatively high pressures, that is to say the coupling will not tighten up to a dangerous degree under such conditions. On the contrary the invention permits for a wide range of angular displacement and can be subjected to severe usage with little possibility of the coupling becoming impaired or the parts deranged.

While it is believed that from the foregoing description the nature and advantages of the invention will be readily apparent, it is to be understood that the invention is not limited to what is herein shown and described, and that such changes may be resorted to when desired as fall within the scope of what is claimed.

What is claimed is:

1. In combination, a pair of pipe sections arranged in end to end relation, annular outwardly directed flanges formed on the adjacent ends of said pipe sections, a nipple partly received by said sections, resilient packing rings surrounding said nipple and contacting the adjacent pipe sections, and means including friction bearings cooperating with said flanges for holding the pipe sections associated for relative rotation and affording said coupling a maximum degree of flexibility.

2. In combination, a pair of pipe sections arranged in end to end relation, annular outwardly directed flanges formed on the adjacent ends of said pipe sections and disposed in contacting engagement with each other, a nipple partly received by said sections and including an annular flange arranged between said sections, resilient packing rings surrounding said nipple, and means including friction bearings cooperating with said flanges on the pipe section for holding the parts associated for relative rotation and affording the coupling a maximum degree of flexibility.

3. In combination, a pair of pipe sections arranged in end to end relation, annular outwardly directed flanges formed on the adjacent ends of the pipe sections and disposed in contacting engagement with each other, a nipple partly received by said sections, means formed on the nipple for preventing longitudinal movement thereof within the pipe sections, resilient packing rings surrounding the nipple, a split clamping ring surrounding said flanges and U-shaped in cross section to receive the latter, and friction bearings located between one side of the ring and the adjacent flange of one of the pipe sections, whereby the latter are held associated for relative rotation, and the coupling in its entirety afforded a maximum degree of flexibility.

4. In combination, a pair of pipe sections arranged in end to end relation and terminating in annular outwardly directed flanges, a sleeve partly received in the abutting ends of said pipe sections, resilient packing rings interposed between said sleeve and the ends of the adjacent pipe sections, said rings being locked against axial movement relatively to one and out of locking engagement with respect to the other of said pipe sections and sleeve, and means cooperating with said flanges for holding the pipe sections associated for relative rotation while preventing axial separation.

5. In combination, a pair of pipe sections arranged in end to end relation and a coupling for securing said pipe sections together in fluid tight relation while permitting rotation of said pipe sections relatively to each other, said coupling comprising a sleeve partially received within the ends of said pipe sections, means for securing said sleeve against axial movement, resilient packing rings interposed between said sleeve and the ends of the adjacent pipe sections, said rings being locked against axial movement relative to one and out of locking engagement with respect to the other of said pipe sections and sleeve, and means cooperating with said pipe section ends for holding the pipe sections together while permitting relative rotation therebetween.

6. In combination, a pipe section terminating in an annular outwardly directed flange, a sleeve partly received in the end of said pipe section, resilient packing rings interposed between said sleeve and the surrounding pipe section, said rings being locked against axial movement relatively to the sleeve but engaging the pipe section frictionally only so as to be capable of movement axially thereof, and means cooperating with said flange for holding said sleeve against axial withdrawal from said pipe section while permitting relative rotation between said sleeve and section.

MARY McGUIRK,
*Administratrix of the Estate of Charles W. McGuirk.*